United States Patent
Sylvain

(10) Patent No.: US 8,638,922 B2
(45) Date of Patent: Jan. 28, 2014

(54) LOCATION-BASED CALL ROUTING

(75) Inventor: Dany Sylvain, Gatineau (CA)

(73) Assignee: Apple Inc., Cupertino, CA (US)

( * ) Notice: Subject to any disclaimer, the term of this patent is extended or adjusted under 35 U.S.C. 154(b) by 2409 days.

(21) Appl. No.: 10/970,590

(22) Filed: Oct. 20, 2004

(65) Prior Publication Data

US 2006/0093121 A1 May 4, 2006

(51) Int. Cl.
*H04M 3/42* (2006.01)

(52) U.S. Cl.
USPC ............. 379/211.02; 379/211.03; 379/211.04

(58) Field of Classification Search
USPC ............. 379/211.01–211.04, 212.01, 221.01
See application file for complete search history.

(56) References Cited

U.S. PATENT DOCUMENTS

| | | | |
|---|---|---|---|
| 6,141,556 A * | 10/2000 | Dougherty et al. | 455/445 |
| 6,320,534 B1 | 11/2001 | Goss | 342/357.1 |
| 6,725,045 B2 | 4/2004 | Oren et al. | 455/445 |
| 2003/0154243 A1* | 8/2003 | Crockett et al. | 709/203 |
| 2004/0203664 A1* | 10/2004 | Lei et al. | 455/414.1 |
| 2005/0063528 A1 | 3/2005 | Pearson et al. | 379/211.01 |
| 2005/0153699 A1 | 7/2005 | Kent, Jr. et al. | 455/445 |

FOREIGN PATENT DOCUMENTS

| | | | |
|---|---|---|---|
| CA | 2455256 | 7/2004 | H04L 29/06 |
| CA | 2502995 | 9/2005 | H04M 1/247 |

OTHER PUBLICATIONS

International Search Report for PCT/IB2005/002906 mailed Feb. 14, 2006.

* cited by examiner

*Primary Examiner* — Antim Shah
(74) *Attorney, Agent, or Firm* — Meyertons, Hood, Kivlin, Kowert & Goetzel, P.C.

(57) ABSTRACT

The present invention provides call processing for an incoming call based on the relative location of the user for which the call is intended. If the user is at a certain location, the incoming call is routed to one or more telephony devices associated with the user or location based on whether the user is at the location. If the user has multiple telephony devices associated with a given location and the user is at that location, an incoming call may be routed to one or more of the telephony devices. If the user is not at the location, the incoming call may proceed in normal course or may be processed as desired based on the user not being at the location. Different telephony devices may be associated with different locations, and different call processing rules may be implemented based on the location of the user.

37 Claims, 6 Drawing Sheets

LOCATION-BASED CALL ROUTING

FIELD OF THE INVENTION

The present invention relates to telephony communications, and in particular to routing a call to one of a number of telephony devices associated with a user based on a relative location of the user.

BACKGROUND OF THE INVENTION

The evolution of modern communications has resulted in most users having multiple telephony devices. These telephony devices include traditional office, home, and mobile telephones, as well as personal computing devices such as personal computers and personal digital assistants, which afford telephony capabilities. These telephony devices may establish communications over one or more circuit-switched, packet-based, or wireless communication networks.

Depending on the relative location of a user, the user will have a preferred telephony device for receiving incoming calls. For example, the user may prefer using her work telephone instead of her mobile telephone while she is in the office. Further, if multiple telephony devices are available to the user in the user's office, the user may prefer one office telephony device over another. Unfortunately, the telephony device receiving a call is generally selected by the caller, and not by the user receiving the call.

Although telephony systems generally support call forwarding, most users do not take the time to configure their respective telephony devices for call forwarding, unless call forwarding is going to be in place for a significant period of time. Continuous configuring of call forwarding mechanisms for multiple devices is both time consuming and cumbersome. Further, it is easy to forget to remove call forwarding configurations when locations or circumstances change.

Since users generally have a preference as to the telephony device at which calls should be received based on the user's location, there is a need to automatically route incoming calls to the telephony device preferred by the user based on the user's location. There is a further need to provide such routing in an automated fashion without requiring significant or continuous manual input by the user.

SUMMARY OF THE INVENTION

The present invention provides call processing for an incoming call based on the relative location of the user for which the call is intended. If the user is at a certain location, the incoming call is routed to one or more telephony devices associated with the user or location based on whether the user is at the location. One or more of the telephony devices may be triggered to ring or otherwise provide an indication that the incoming call is being received. Thus, if the user has multiple telephony devices associated with a given location and the user is at that location, an incoming call may be routed to one or more of the telephony devices. Otherwise, if the user is not at the location, the incoming call may proceed in normal course or may be processed as desired based on the user not being at the location. In one embodiment, the location is a defined zone, which is associated with multiple telephony devices. Different telephony devices may be associated with different zones, and different call processing rules may be implemented based on the zone in which the user is located. The routing may further be based on other criteria including the caller, time, and date.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention dynamically controls how an incoming call is processed based on the relative location of a called party. Based on the location of the called party, the incoming call may be routed to one or more telephony devices proximate to the location of the called party. The called party's location may be an exact location or may be an area relative to the location. For clarity throughout the following description, an exact location or area about a certain location is referred to as a zone. When the called party is within a particular zone, incoming calls intended for the called party may be routed to one or more telephony devices associated with the zone. The incoming call may be routed to multiple devices in parallel, sequentially, or in any desired combination. Notably, the incoming call may be diverted to one or more alternate telephony devices, which are different than the telephony device originally intended to be reached by the caller. As will be discussed further below, any number of techniques may be used to determine the relative location, or presence, of the called party with respect to the particular zone. Further, different zones may be defined in which different call processing rules are used. If the user is not relatively close to or within a particular zone, the call may proceed in normal fashion, be diverted to voicemail, be rejected, be forwarded to another telephony device, or be processed in any fashion desired by the called party.

Figure 1:
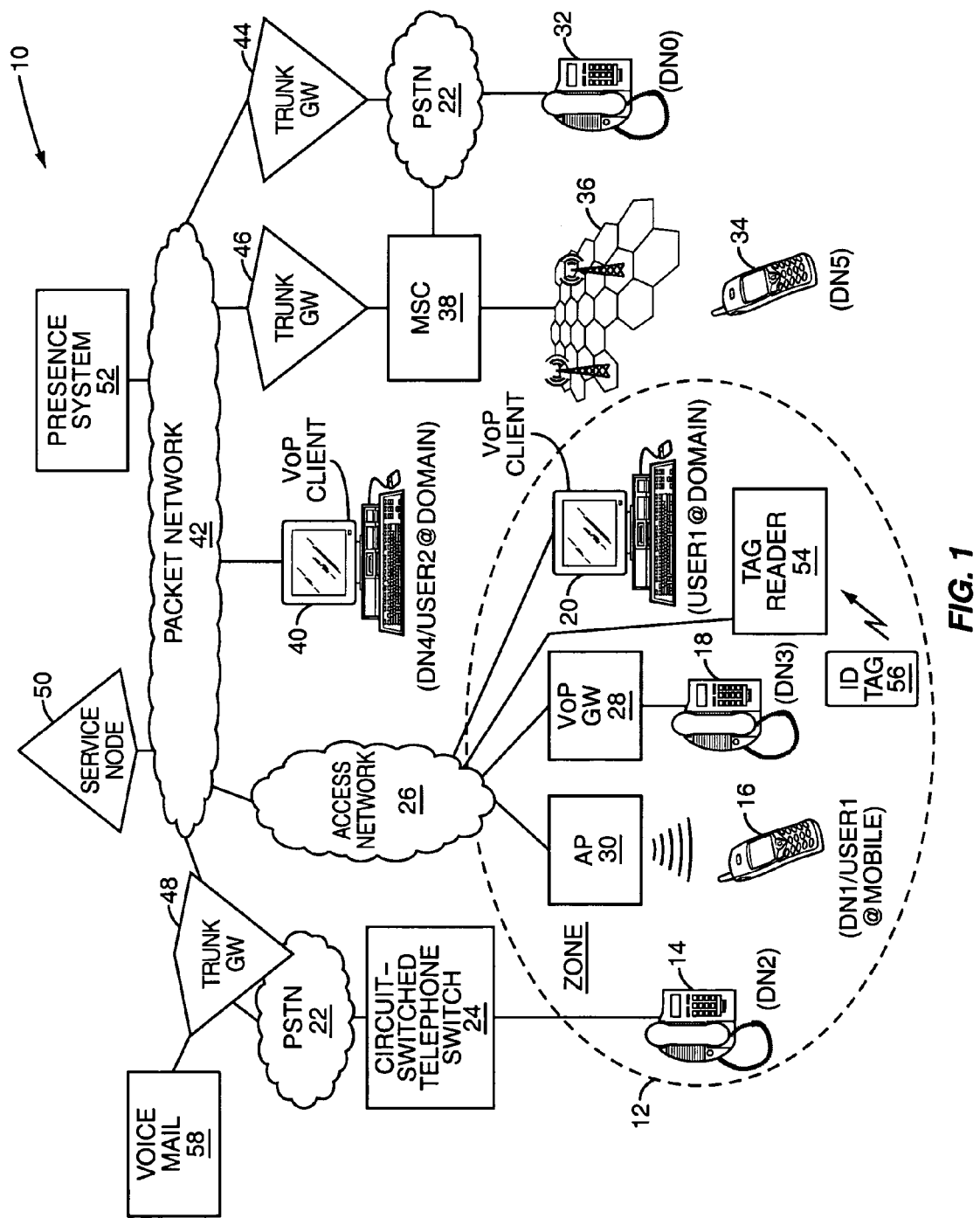
FIG. 1 is a block representation of a communication environment according to one embodiment of the present invention.

Prior to delving into the details of the present invention and discussing multiple call handling scenarios, an overview of an exemplary communication environment 10 in which the present invention may be implemented is described in association with FIG. 1. Initially, a zone 12 may be defined at or about a given location. For a given zone 12, one or more telephony devices, which are associated with a particular user, are defined. These telephony devices may take numerous forms, such as a circuit-switched telephone 14, a mobile terminal 16, a voice-over-packet (VoP) telephone 18, a VoP communication client 20, or any other available telephony device. The circuit-switched telephone 14 may be coupled to the Public Switched Telephone Network (PSTN) 22 via a traditional circuit-switched telephone switch 24. The mobile terminal 16 may be configured to support both cellular communications and local wireless communications, such as those available using Bluetooth or 802.11 wireless communication techniques.

To support local wireless communications as well as other packet-based communications with the VoP telephone 18 and the VoP communication client 20, an access network 26 is provided to support packet-based communications. A VoP gateway (GW) 28 may be used to connect the VoP telephone 18 with the access network 26, wherein the VoP gateway 28 provides the necessary interworking between the VoP telephone 18 and the access network 26 for telephony operation. To support local wireless communications with the mobile terminal 16, an access point (AP) 30 may be coupled to the access network 26 and used to provide interworking between the access network 26 and the mobile terminal 16. The access point 30 may be a wireless local area network (WLAN) access point implementing one or more Bluetooth or 802.11 communication standards. The VoP communication client 20 may couple directly to the access network 26. Thus, communications with the mobile terminal 16, the VoP telephone 18, and the VoP communication client 20 may be facilitated via the access network 26 using packet-based communications. For circuit-switched communications, the circuit-switched telephone 14 may be incorporated. Importantly, the circuit-switched telephone 14, mobile terminal 16, VoP telephone 18, and the VoP communication client 20 are associated with the same zone 12. For the present invention, incoming calls intended for any one of these devices may be controlled and rerouted to another of these telephony devices based on the relative location of the called party associated with the telephony devices with respect to the zone 12.

Although incoming calls may originate from any number of devices or locations, several telephony devices from which incoming calls may be originated are illustrated. First, a circuit-switched telephone 32 coupled to the PSTN 22 may be used to originate an incoming call. Second, a mobile terminal 34, which is capable of effecting cellular communications through a network of base stations 36 and a mobile switching center (MSC) 38 may be used to originate incoming calls to the called party. Further, a VoP communication client 40 may be used to initiate incoming calls to the called party. Again, incoming calls from any of these telephony devices may be processed based on the relative location of the called party with respect to the zone 12. As illustrated, assume the core communication network connecting all the various telephony devices and the respective access networks is a packet network 42. In this embodiment, incoming calls originating from the circuit-switched telephone 32 may pass through the PSTN 22 and a trunk gateway 44 to reach the packet network 42. As such, the trunk gateway 44 will provide sufficient interworking between the packet network 42 and telephony trunks of the PSTN 22 to facilitate calls. Similarly, a trunk gateway 46 may be provided as an interface between the packet network 42 and the MSC 38. The VoP communication client 40 may directly or indirectly connect to the packet network 42. Further, the PSTN 22 may be coupled to the packet network 42 through trunk gateway 48 in addition to trunk gateway 44, such that there are multiple interfaces between the PSTN 22 and the packet network 42.

At the heart of the present invention is a service node 50, which may be implemented in a separate call processing device or within a circuit-switched or packet-based switching system or network for wired or wireless communications. The service node 50 is configured to receive indications that an incoming call to a selected telephony device is being received, and determine how to process the incoming call based on the location of a called party with respect to one or more zones 12. The service node 50 will implement call processing rules that are preconfigured in part by the called party. The relative location of the called party may be determined through any number of techniques, including accessing a presence system 52 that is configured to determine or otherwise track the location of the called party and provide location information, which in this implementation includes presence information, pertaining to the called party.

For additional information on call processing in light of presence information, further attention is directed to commonly assigned U.S. patent application Ser. No. 10/034,431 filed Dec. 27, 2001 entitled DYNAMIC PRESENCE MANAGEMENT; Ser. No. 10/034,429 filed Dec. 27, 2001 entitled REDIRECTION OF INSTANT MESSAGING BASED ON USER PRESENCE; Ser. No. 10/036,247 filed Dec. 27, 2001 entitled PERSONAL USER AGENT; Ser. No. 10/034,519 filed Dec. 28, 2001 entitled BUDDY LIST STATUS NOTIFICATION; Ser. No. 10/079,237 filed Feb. 20, 2002 entitled TELEPHONY USAGE DERIVED PRESENCE INFORMATION; Ser. No. 10/100,703 filed Mar. 19, 2002 entitled MONITORING NATURAL INTERACTION FOR PRESENCE DETECTION; Ser. No. 10/119,923 filed Apr. 10, 2002 entitled PRESENCE INFORMATION BASED ON MEDIA ACTIVITY; Ser. No. 10/119,783 filed Apr. 10, 2002 entitled PRESENCE INFORMATION SPECIFYING COMMUNICATION PREFERENCES; Ser. No. 10/245,476 filed Sep. 17, 2002 entitled PROXIMITY DETECTION FOR MEDIA PROXIES; Ser. No. 10/336,523 filed Jan. 3, 2003 entitled DISTRIBUTED SERVICES BASED ON PRESENCE TECHNOLOGY; Ser. No. 10/262,393 filed Oct. 1, 2002 entitled PRESENCE INFORMATION FOR TELEPHONY USERS; Ser. No. 10/247,591 filed Sep. 19, 2002 entitled DYNAMIC PRESENCE INDICATORS; Ser. No. 10/331,706 filed Dec. 30, 2002 entitled PRESENCE ENABLED QUEUE MANAGEMENT; Ser. No. 10/325,144 filed Dec. 20, 2002 entitled PROVIDING COMPUTER PRESENCE INFORMATION TO AN INTEGRATED PRESENCE SYSTEM; and Ser. No. 10/805,887 filed Mar. 22, 2004 entitled PERSONAL LOCATION INFORMATION MANAGEMENT; and also to issued U.S. Pat. No. 6,658,095 issued Dec. 2, 2003 entitled CUSTOMIZED PRESENCE INFORMATION DELIVERY.

Alternatively, the service node 50 may determine the relative location of the called party based on direct or indirect interactions with one of the called party's telephony devices or devices that support the telephony devices, such as the access point 30. Further, auxiliary devices, such as a identification tag reader 54, may be used to determine the relative presence and thus location of the called party when the called party's ID tag 56 is within a certain range or has been used to afford the called party access to an area associated with the zone 12. The access point 30 may be used directly or indirectly to determine whether the mobile terminal 16 is sufficiently proximate to the zone 12 in order to determine that the called party is within the zone 12. The mobile terminal 16 or the access point 30 may report such presence information to the service node 50. The zone 12 may be defined by the communication range of the access point 30, wherein the access point 30 may provide identification information to the mobile terminal 16 that is then forwarded to the service node 50 through a cellular network or via the access point 30 and the access network 26. Further, more complex access points 30 may interact with the mobile terminal 16 and provide reporting to the service node 50. Any interaction with the various devices illustrated or those not illustrated that are within the zone 12 may be used to determine the relative location of the called party and report such information to the service node 50.

Those skilled in the art will recognize that the elements illustrated in FIG. 1 are provided to facilitate a discussion of certain embodiments of the present invention. Other telephony elements may be included, such as the voicemail system 58 to which incoming calls may be forwarded if an incoming call is not answered or the call processing rules implemented by the service node 50 direct the incoming call to the voicemail system 58 for the called party.

Figure 2A:
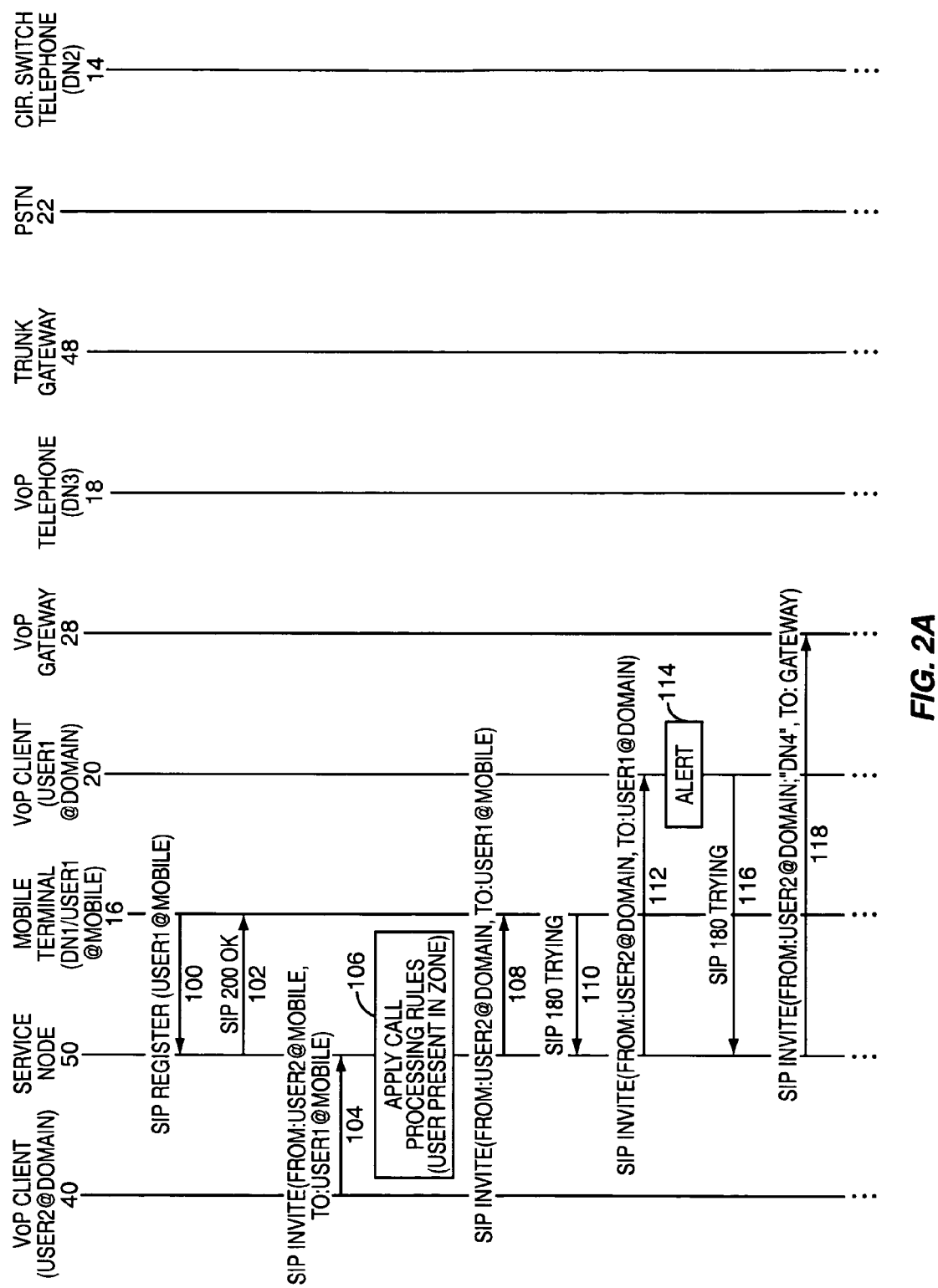
FIGS. 2A and 2B are a communication flow illustrating a first exemplary communication scenario according to the present invention.
Figure 2B:
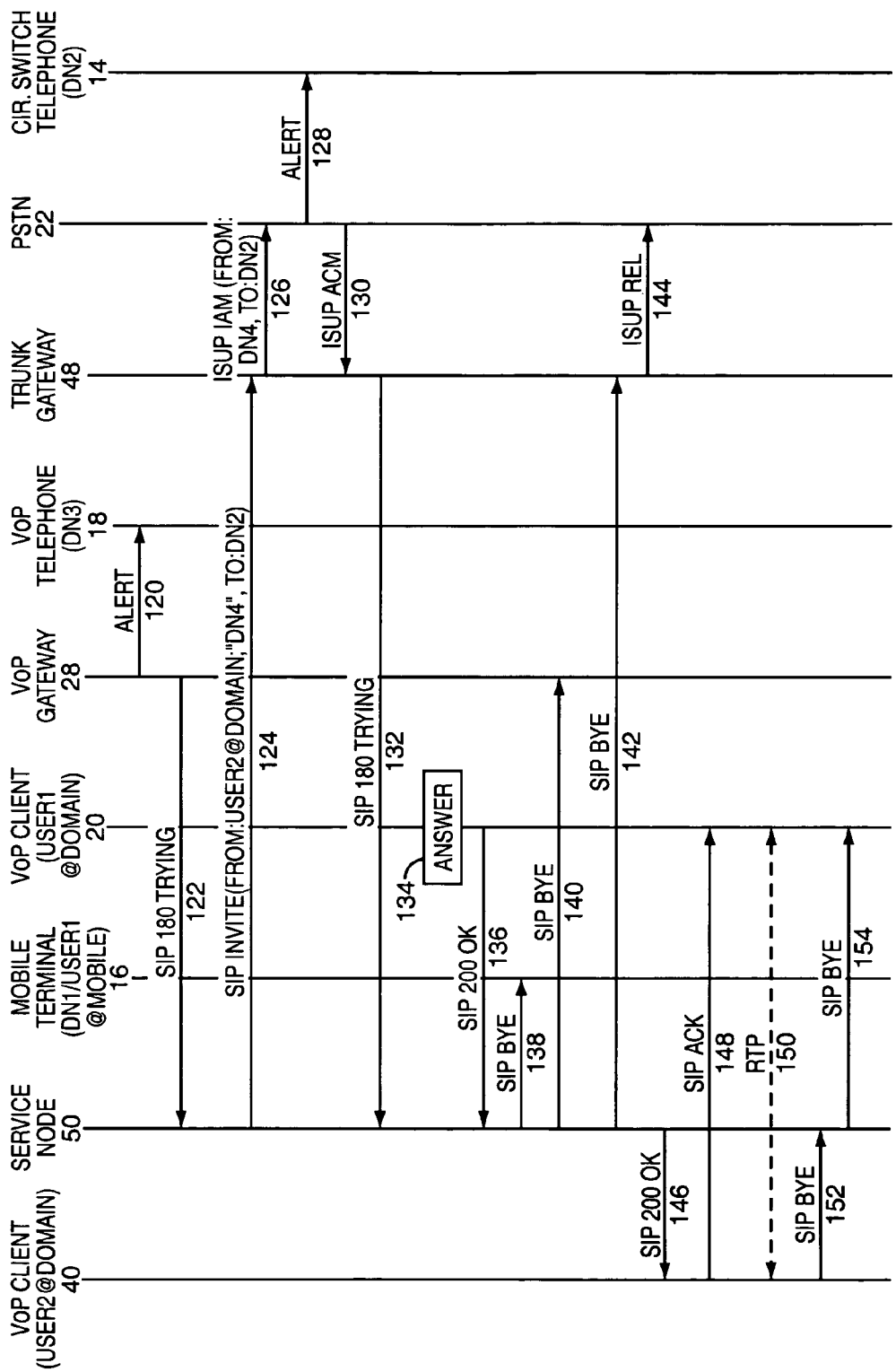

Turning now to FIGS. 2A and 2B, an exemplary communication flow is provided. In this example, assume the called party is within the zone 12, and the call processing rules implemented by the service node 50 dictate that multiple telephony devices ring until one is answered. The incoming call is established with the telephony device that is answered by the called party. The call processing rules implemented are selected because the called party is determined to be within the zone 12. In addition to the relative presence of the called party within the zone 12, the call processing rules may be based on caller identification, time of day, other presence information, or any other information made available to the service node 50 and deemed relevant to determining how to process the incoming call. In this example, assume that if the called party is within the zone 12, an incoming call will result in the mobile terminal 16, VoP communication client 20, VoP telephone 18, and circuit-switched telephone 14 ringing simultaneously. As illustrated, the VoP communication client 20 is answered and the incoming call is established with the VoP communication client 20 using a Real Time Protocol (RTP) communication session. Further, assume the Session Initiation Protocol (SIP) is used to establish communication sessions to facilitate alerting multiple telephony devices, as well as establishing a communication session for the call.

Initially, assume the mobile terminal 16 moves within the zone 12 to indicate that the user of the mobile terminal 16 (called party) is within the zone 12. Through an interaction with the access point 30, the mobile terminal 16 will detect that communications with the access point 30 are possible, and the mobile terminal 16 will send a SIP Register message identifying itself as USER1@ MOBILE to the service node 50 (step 100). The service node 50 will recognize that the user is within the zone 12 and respond to the SIP Register message by sending a SIP 200 OK message back to the mobile terminal 16 (step 102). At this point, the service node 50 will recognize the user as being within the zone 12.

Assume that an incoming call is initiated from the VoP communication client 40, which is associated with an address of USER2@DOMAIN, to the user using the address USER1@MOBILE. As such, the VoP communication client 40 will send a SIP Invite message toward USER1@MOBILE (step 104). The service node 50 may act as a SIP proxy, and as such will receive the SIP Invite message, and recognize that the Invite message is intended for the mobile terminal 16 that is associated with special call processing rules when the user is present within the zone 12. As such, the service node 50 will apply call processing rules for when the called party is within the zone 12 (step 106). Assume the call processing rules dictate that multiple telephony devices associated with the user be alerted, and the incoming call be established with the first one of the associated telephony devices to be answered. As such, the service node 50 may send a SIP Invite message toward the mobile terminal 16 via the access point 30 (step 108). The SIP Invite message will indicate that it is from USER2@DOMAIN and intended for USER1 @MOBILE, which is the address associated with the mobile terminal 16. The mobile terminal 16 will respond by sending a SIP 180 Trying message back to the service node 50 (step 110). At this point, the mobile terminal 16 will provide an alert that an incoming call is being received, such as by initiating ringing. The service node 50 may also send a SIP Invite message to the VoP communication client 20 indicating that it is from USER2@DOMAIN and intended for USER1@MOBILE (step 112). In response to the SIP Invite message, the VoP communication client 20 will provide an alert such as an on-screen popup window (step 114) indicating there is an incoming call, as well as respond with a SIP 180 Trying message (step 116).

Similarly, the service node 50 will send a SIP Invite message toward the VoP telephone 18. In this instance, the VoP telephone 18 is supported by the VoP gateway 28, and as such, the service node 50 will send a SIP Invite message to the address for the VoP gateway 28 and indicate that the Invite message is from USER2@DOMAIN and optionally from directory number DN4, which is also associated with the VoP client 40 (step 118). In response, the VoP gateway 28 will send an alert to the VoP telephone 18 to indicate that an incoming call is being received (step 120) as well as respond to the service node 50 by sending a SIP 180 Trying message (step 122). Further, the service node 50 may initiate call termination to the circuit-switched telephone 14, which is associated with directory number DN2. As such, the service node 50 may send a SIP Invite message from USER2@DOMAIN (and perhaps directory number DN4) to directory number DN2 toward the trunk gateway 48 (step 124). The trunk gateway 48 will initiate ringing of the circuit-switched telephone 14 by sending an Integrated Services User Part (ISUP) Initial Address Message (IAM) through the PSTN 22 (step 126), which will provide an alert or otherwise cause the circuit-switched telephone 14 to ring (step 128). While the circuit-switched telephone 14 is ringing, an ISUP Address Complete Message (ACM) will be reported back to the trunk gateway 48 (step 130). The trunk gateway 48 will then respond to the original SIP Invite message (in step 124) by sending a SIP 180 Trying message (step 132).

At this point, the mobile terminal 16, VoP communication client 20, VoP telephone 18, and circuit-switched telephone 14 are providing alerts, such as ringing, to indicate that an incoming call is being received. The messaging corresponding to initiating these alerts may have included caller identification information, which may be provided in association with the alerts through a caller ID display or a popup window associated with providing the particular alert.

Accordingly, the various telephony devices associated with the zone 12 are providing alerts to the called party that a call is being received. The called party has the option of answering any of these telephony devices. Assume the called party answers the VoP communication client 20 (step 134). Upon being answered, the VoP communication client 20 will send a SIP 200 OK message to the service node 50 to indicate that it has been answered (step 136). The service node 50 will recognize that the VoP communication client 20 has been answered, and will take the necessary steps to stop the remaining telephony devices from providing continuous alerts to the called party. As such, the service node 50 may send a SIP Bye message to the mobile terminal 16 (step 138), to the VoP gateway 28 to stop the alerting of the VoP telephone 18 (step 140), and to the trunk gateway 48 (step 142), which will send an ISUP Release (REL) message to the PSTN 22 (step 144), which will in turn stop the alerting of the circuit-switched telephone 14.

The service node 50 will also send a SIP 200 OK message back to the VoP communication client 40 that initiated the incoming call to indicate that the call has been answered and a communication session to support the call should be established (step 146). The VoP communication client 40 will respond with a SIP Acknowledgement message (ACK) (step 148), wherein the VoP communication client 40 and the VoP communication client 20 may directly or indirectly interact with one another to establish an RTP communication session to facilitate bidirectional communications to support the call (step 150). Once the call is ended by the VoP communication client 40, a SIP Bye message is sent to the service node 50 (step 152), which will send a SIP Bye message to the VoP communication client 20 (step 154) to end the RTP communication session (established in step 150). In the above example, multiple telephony devices were caused to provide alerts to the called party in a simultaneous fashion. The call processing rules may be configured to sequentially ring various telephony devices for a certain amount of time until one of the telephony devices is answered or a timeout occurs, which directs the incoming call to the voicemail system 58. Those skilled in the art will recognize numerous scenarios where the telephony devices are alerted of an incoming call in a sequential fashion, substantially simultaneous fashion, or a combination thereof.

Figure 3:
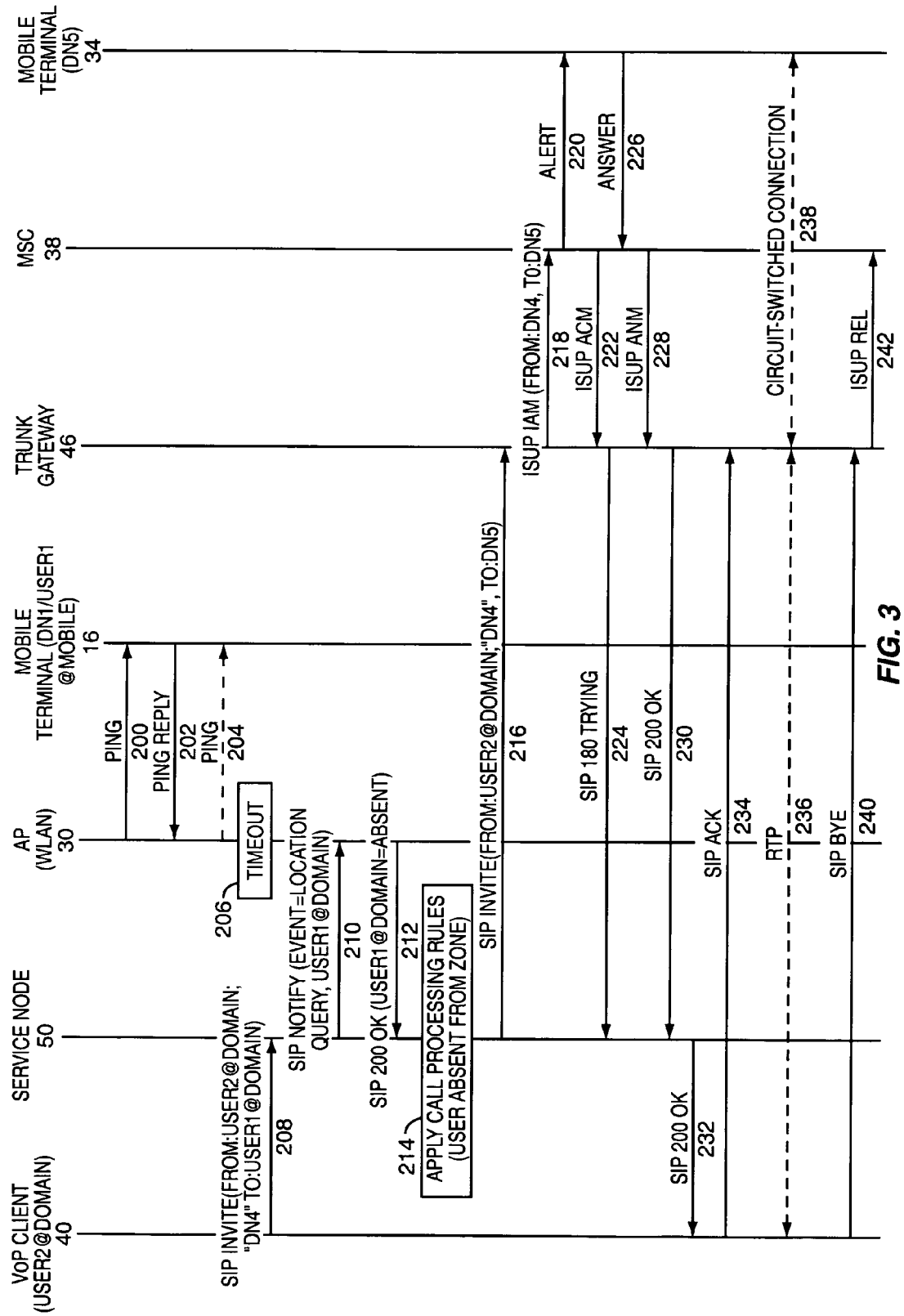
FIG. 3 is a communication flow illustrating a second exemplary communication scenario according to the present invention.

Turning now to FIG. 3, a scenario is provided wherein the called party is not within the zone 12 when an incoming call is received for one of the telephony devices associated with both the called party and the zone 12. Initially, assume the access point 30 provides periodic interrogation pings to determine whether the mobile terminal 16 is within communication range. As such, when the access point 30 sends an interrogation ping toward the mobile terminal 16 (step 200), the mobile terminal 16, if in the zone 12, will receive the ping and provide a ping reply back to the access point 30 (step 202). Assume that the mobile terminal 16 moves outside of the zone 12 and does not receive the next interrogation ping (step 204), and as such does not respond to the access point 30. After a certain number of tries, the access point 30 will timeout (step 206) and recognize that mobile terminal 16 is no longer within the zone 12.

Assume at this point the VoP communication client 40 initiates a call to the user using the address USER1@DOMAIN, which is associated with the VoP communication client 20. As such, a SIP Invite message is sent toward the VoP communication client 20 and is received by the service node 50, which is acting as a proxy (step 208). The SIP Invite message will indicate that the Invite message is from USER2@DOMAIN (DN4) and intended for USER1@DOMAIN. The service node 50 will recognize that call processing rules are associated with USER1@DOMAIN, and will take the necessary steps to determine the relative location of the user. In this scenario, assume that the service node 50 is adapted to query the access point 30 to determine if the mobile terminal 16 is within the zone 12. As such, a SIP Notify message may be sent to the access point 30 to request a location query for USER1@DOMAIN (step 210). The access point 30 will recognize that the mobile terminal 16 is not responding to the interrogation pings, and will respond to the service node request by sending a SIP 200 OK message indicating that USER1@DOMAIN is absent from the zone 12 (step 212). The service node 50 will then apply call processing rules indicating that the user is absent from the zone 12 (step 214).

Assume the call processing rules indicate that when the incoming call is intended for the VoP communication client 20 and the user is not within the zone 12, that the call be forwarded to the mobile terminal 34 using directory number DN5. As such, the service node 50 may send a SIP Invite to trunk gateway 46 to establish a call from USER2@DOMAIN (DN4) to the mobile terminal 34 using directory number DN5 (step 216). The trunk gateway 46 may send an ISUP IAM over the PSTN 22 to establish a circuit-switched connection between the trunk gateway 46 and the mobile terminal 34 via the MSC 38. As such, an ISUP IAM is sent to the MSC 38 to indicate a call is being initiated from directory number DN4 to directory number DN5 (step 218). The MSC 38 will then send an incoming call alert to the mobile terminal 34 via the network of base stations 36 (step 220), as well as send an ISUP ACM back to the trunk gateway 46 (step 222), which will respond to the SIP Invite message by sending a SIP 180 Trying message to the service node 50 (step 224). When the mobile terminal 34 is answered (step 226), the MSC 38 will send an ISUP Answer Message (ANM) to the trunk gateway 46 (step 228), which will send a SIP 200 OK message to the service node 50 indicating that the mobile terminal 34 has been answered (step 230). The service node 50 will forward the SIP 200 OK message to the VoP communication client 40 (step 232), which will respond with a SIP Acknowledgement message back to the trunk gateway 46 (step 234). At this point, a bidirectional RTP session is established between the trunk gateway 46 and the VoP communication client 40, and a circuit-switched connection is established between the trunk gateway 46 and the mobile terminal 34 (step 238). The RTP session and the circuit-switched session are effectively coupled via the trunk gateway 46 to allow establishment of a call between the VoP communication client 40 and the mobile terminal 34. When the call ends, the VoP communication client 40 may send a SIP Bye message toward the trunk gateway 46 directory or indirectly via the service node 50 to indicate that the call has ended (step 240). The trunk gateway 46 will end the RTP session, as well as send an ISUP Release message to the MSC 38 to end the circuit-switched connection (step 242) and the call is ended.

Figure 4:
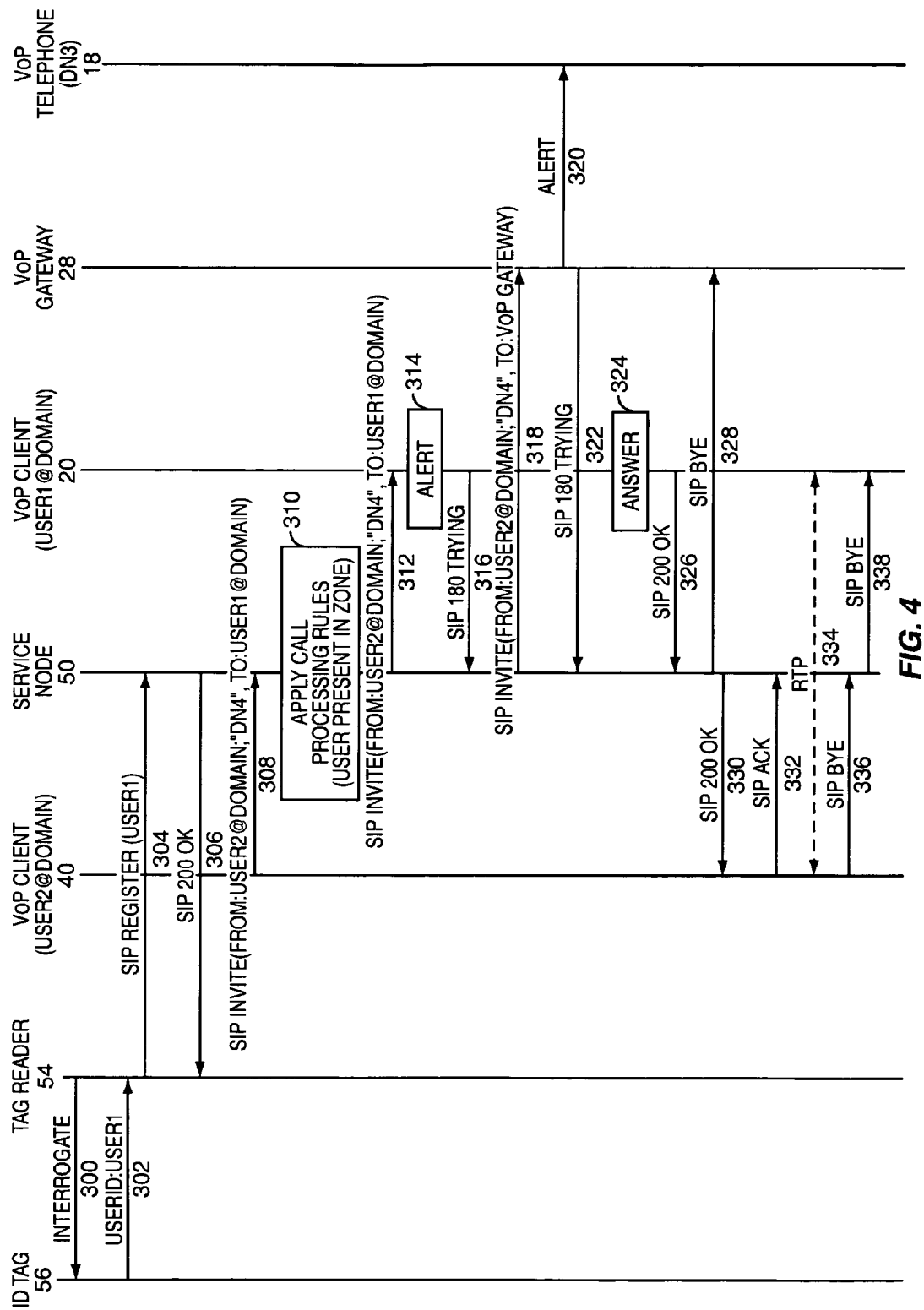
FIG. 4 is a communication flow illustrating a third exemplary communication scenario according to the present invention.

Turning now to FIG. 4, another exemplary scenario is illustrated wherein the presence of the user within the zone 12 is determined by the tag reader 54. Further, when the user is within the zone 12, incoming calls to one or more of the telephony devices associated with the user and the zone 12 result in termination attempts to the VoP communication client 20 as well as the VoP telephone 18. Initially, assume the tag reader 54 is providing interrogation signals in search of an ID tag 56 (step 300). If the ID tag 56 is within range of the tag reader 54, it may respond by providing a user ID (USER1) to the tag reader 54 (step 302). The tag reader 54 may communicate with the service node 50 and send a SIP Register message to register USER1 as being present within the zone 12 or simply as having the ID tag 56 read by tag reader 54 (step 304). The service node 50 will process the information and determine that the user is present within the zone 12 and send a SIP 200 OK message back to the tag reader 54 in response to the SIP Register message (step 306).

At this point, assume the VoP communication client 40 initiates a call to the VoP communication client 20 using the address USER1@DOMAIN. The VoP communication client 40 may send a SIP Invite message from USER2@DOMAIN (or DN4) to USER1@DOMAIN (step 308). The service node 50 will recognize that special call processing rules are associated with the VoP communication client 20 or the address USER1@DOMAIN, and take the necessary steps to apply the call processing rules (step 310). In this instance, the call processing rules are based on whether or not the user is present within the zone 12. Since the tag reader 54 has registered the user as being present within the zone 12, the service node 50 will apply call processing rules indicating that the user is present within the zone 12.

In this example, assume that when an incoming call is directed to USER1@DOMAIN or perhaps any of the telephony devices associated with the zone 12, the incoming call will result in termination attempts to the VoP communication client 20 as well as the VoP telephone 18. As such, a SIP Invite message will be sent from the service node 50 to the VoP communication client 20 (step 312). The SIP Invite message will indicate that it is from USER2@DOMAIN or directory number DN4 and is intended for USER1@DOMAIN. Upon receipt of the SIP Invite message, the VoP communication client 20 will provide an alert, such as ringing or a popup window indicative of an incoming call (step 314). The VoP communication client 20 may respond to the SIP Invite message by sending a SIP 180 Trying message back to the service node 50 (step 316). Further, the service node 50 will send a SIP Invite message in an attempt to establish a session with the VoP telephone 18. In this instance, the VoP telephone 18 is supported by the VoP gateway 28, and as such, the SIP Invite message is sent from the service node 50 to the VoP gateway 28 (step 318), which will take the necessary steps to trigger an alert to the VoP telephone 18 (step 320). The interface between the VoP gateway 28 and the VoP telephone 18 may be packet-based or circuit-switched, as those skilled in the art will recognize. At this point, the VoP communication client 20 and the VoP telephone 18 are providing alerts of some kind to the called party. The VoP gateway 28 will respond to the received SIP Invite message by sending a SIP 180 Trying message back to the service node 50 (step 322).

Assume the VoP communication client 20 is answered (step 324), and sends a SIP 200 OK message to the service node 50 (step 326) to indicate that it has been answered. The service node 50 will recognize that the VoP communication client 20 has been answered, and send a SIP Bye message toward the VoP gateway 28 to end the attempt to establish the call with the VoP telephone 18 (step 328). As such, the VoP gateway 28 will take the necessary steps to stop the VoP telephone 18 from providing an alert indicative of an incoming call. The service node 50 will also send a SIP 200 OK message back toward the VoP communication client 40 in response to the original SIP Invite sent in step 308 (step 330). The VoP communication client 40 will respond with a SIP Acknowledgement message (step 332) and a bidirectional RTP session is established between the VoP communication client 40 and the VoP communication client 20 (step 334). When the VoP communication client 40 ends the call, it may send a SIP Bye message toward the service node 50 (step 336), which will forward the SIP Bye message to the VoP communication client 20 to end the communication session, and thus the call (step 338).

The previous examples are illustrative of the concepts of the present invention. The invention can be extended such that there are multiple zones 12 registered with the service node 50. Each zone 12 can have different call processing rules. For example, when the user is present within a first zone 12, incoming calls to any of the associated telephony devices result in the simultaneous ringing of the user's office telephone and telephony client running on a personal computer. When the user is present within a second zone 12, all incoming calls to any of the associated telephony devices are routed to the user's mobile terminal 16. When the user is present within a third zone 12 associated with a conference room, only calls from select callers are routed to the mobile terminal 16, while all other calls are routed to the voicemail system 58. With any of these rules, they may be adjusted or modified based on time of day, date, the calling party, the affected zone, or any combination thereof. Further, defined zones 12 may overlap and the service node 50 may have different rules for when the user is within overlapping zones 12 or in portions of zones 12 that overlap. A zone may also be defined by the mobile terminal 16 being within the range of one access point 30 or a combination of access points 30. For example, the user may not be considered within a zone 12 unless a certain combination of access points 30 can simultaneously be communicated with via the mobile terminal 16. The definition of a zone 12 and the rules applied thereto may also be affected by the relative power levels associated with local wireless communications or other criteria. Further, the service node 50 may determine the relative location of a user with respect to one or more zones 12 based on information automatically provided to the service node 50 from various presence detection systems or devices, including the telephony devices associated with the user. Alternatively, the service node 50 may poll certain devices to determine the relative location of the user or whether the user is within a certain zone 12.

Figure 5:
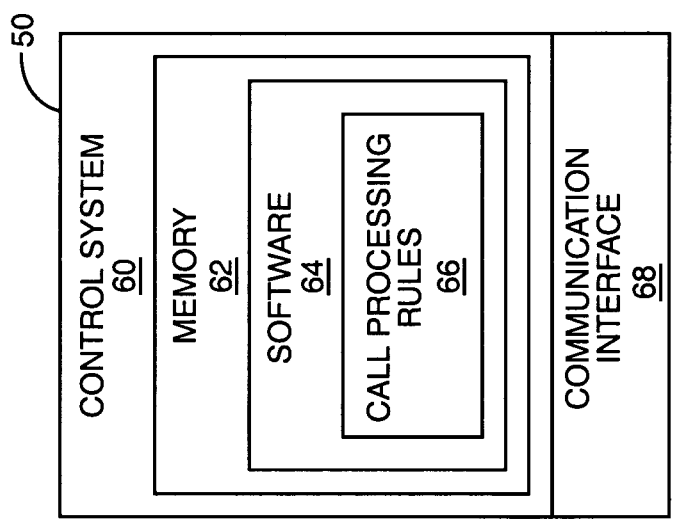
FIG. 5 is a block representation of a service node according to one embodiment of the present invention.

With reference to FIG. 5, a block representation of a service node 50 is provided according to one embodiment of the present invention. Notably, the functionality of the service node 50 may be implemented in other devices, including telephony switches that support one or more telephony devices within or without the respective zones 12. The service node 50 will generally include a control system 60 having memory 62 for running the requisite software 64 to facilitate the operation of the service node 50 as described above. The software 64 will include the call processing rules 66 to apply for the various users. The control system 60 is also associated with a communication interface 68 to facilitate communications with the various systems and devices through which information must be obtained and call signaling information must be exchanged.

Those skilled in the art will recognize improvements and modifications to the preferred embodiments of the present invention. All such improvements and modifications are considered within the scope of the concepts disclosed herein and the claims that follow.

What is claimed is:

1. A method for routing incoming calls comprising:
   a) associating a plurality of telephony devices with at least one zone;
   b) detecting an incoming call intended for one of the plurality of telephony devices;
   c) determining, in response to detecting the incoming call, that the one of the plurality of telephony devices is associated with the at least one zone;
   d determining, in response to the determination that the one of the plurality of telephony devices is associated with the at least one zone, if a user associated with the plurality of telephony devices is registered within the at least one zone; and
   e initiating an alert for the incoming call based on a call processing rule associated with the at least one zone.

2. The method of claim 1 wherein initiating the alert further comprises initiating the alert for the incoming call to at least one of the plurality of telephony devices.

3. The method of claim 2 wherein initiating the alert further comprises initiating the alert for the incoming call to at least one telephony device not associated with the at least one zone when the user is not registered within the at least one zone.

4. The method of claim 1 wherein alerts for the incoming call are initiated for at least two of the plurality of telephony devices and further comprising effecting establishment of the incoming call to a first of the at least two of the plurality of telephony devices to be answered.

5. The method of claim 4 wherein the alerts for the incoming call are initiated substantially simultaneously for the at least two of the plurality of telephony devices.

6. The method of claim 4 wherein the alerts for the incoming call are initiated sequentially for the at least two of the plurality of telephony devices, such that a second one of the at least two of the plurality of telephony devices does not provide an alert until the first of the at least two of the plurality of telephony devices has stopped providing an alert.

7. The method of claim 1 wherein initiating the alert further comprises initiating the alert for the incoming call to at least one telephony device not associated with the at least one zone when the user is not registered within the at least one zone.

8. The method of claim 1 wherein a plurality of zones are provided, and initiating the alert for the incoming call is based on one of the plurality of zones at which the user is registered located.

9. The method of claim 1 further comprising receiving location related information bearing on a relative location of the user and using the location related information to determine whether the user is registered within the at least one zone.

10. The method of claim 1 wherein the zone is defined by coverage of a wireless access point, and wherein the telephony device initiated the registration message upon detection of the presence of the wireless access point.

11. The method of claim 1 wherein the at least one zone is defined by a place.

12. The method of claim 1 further comprising effecting establishment of the incoming call.

13. The method of claim 1 wherein the alert is initiated based in part on a caller originating the incoming call.

14. The method of claim 1 wherein the alert is initiated based in part on a time the incoming call is originated.

15. The method of claim 1 wherein the alert is initiated based in part on a date the incoming call is originated.

16. The method of claim 1 wherein determining if the user associated with the plurality of telephony devices is registered within the at least one zone is based on a registration message initiated by a device associated with the user.

17. The method of claim 16 wherein the device associated with the user comprises one of the plurality of telephony devices.

18. The method of claim 16, wherein the registration message comprises a Session Initiation Protocol register message.

19. A system for routing incoming calls comprising:
a) a communication interface; and
b) a control system associated with the communication interface and adapted to:
i) associate a plurality of telephony devices with at least one zone;
ii) detect an incoming call intended for one of the plurality of telephony devices;
iii) determine, in response to detecting the incoming call, that the one of the plurality of telephony devices is associated with the at least one zone;
iv) determine, in response to the determination that the one of the plurality of telephony devices is associated with the at least one zone, if a user associated with the plurality of telephony devices is registered within the at least one zone; and
v) initiate an alert for the incoming call based on a call processing rule associated with the at least one zone.

20. The system of claim 19 wherein to initiate the alert, the control system is further adapted to initiate the alert for the incoming call to at least one of the plurality of telephony devices.

21. The system of claim 20 wherein to initiate the alert, the control system is further adapted to initiate the alert for the incoming call to at least one telephony device not associated with the at least one zone when the user is not registered within the at least one zone.

22. The system of claim 19 wherein alerts for the incoming call are initiated for at least two of the plurality of telephony devices and the control system is further adapted to effect establishment of the incoming call to a first of the at least two of the plurality of telephony devices to be answered.

23. The system of claim 22 wherein the alerts for the incoming call are initiated substantially simultaneously for the at least two of the plurality of telephony devices.

24. The system of claim 22 wherein the alerts for the incoming call are initiated sequentially for the at least two of the plurality of telephony devices, such that a second one of the at least two of the plurality of telephony devices does not provide an alert until the first of the at least two of the plurality of telephony devices has stopped providing an alert.

25. The system of claim 19 wherein to initiate the alert, the control system is further adapted to initiate the alert for the incoming call to at least one telephony device not associated with the at least one zone when the user is not registered within the at least one zone.

26. The system of claim 19 wherein a plurality of zones are provided, and initiating the alert for the incoming call is based on one of the plurality of zones at which the user is registered.

27. The system of claim 19 wherein to determine whether the user is at the zone, the control system accesses location related information bearing on a relative location of the user upon detecting the incoming call.

28. The system of claim 19 wherein the control system is further adapted to receive location related information bearing on a relative location of the user and using the location related information to determine whether the user is registered within the at least one zone.

29. The system of claim 19 wherein the zone is defined by coverage of a wireless access point, and wherein the device initiated the registration message upon detection of the presence of the wireless access point.

30. The system of claim 19 wherein the at least one zone is defined by a place.

31. The system of claim 19 wherein the control system is further adapted to effect establishment of the incoming call.

32. The system of claim 19 wherein the alert is initiated based in part on a caller originating the incoming call.

33. The system of claim 19 wherein the alert is initiated based in part on a time the incoming call is originated.

34. The system of claim 19 wherein the alert is initiated based in part on a date the incoming call is originated.

35. The system of claim 19 wherein determining if the user associated with the plurality of telephony devices is registered within the at least one zone is based on a registration message initiated by a device associated with the user.

36. The system of claim 35 wherein the device associated with the user comprises one of the plurality of telephony devices.

37. The system of claim 35, wherein the registration message comprises a Session Initiation Protocol register message.

* * * * *